(12) United States Patent
Hwang et al.

(10) Patent No.: US 11,678,330 B2
(45) Date of Patent: Jun. 13, 2023

(54) METHOD FOR TRANSMITTING AND RECEIVING DOWNLINK CONTROL CHANNEL, AND APPARATUS THEREFOR

(71) Applicant: LG ELECTRONICS INC., Seoul (KR)

(72) Inventors: Daesung Hwang, Seoul (KR); Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 17/261,969

(22) PCT Filed: Jul. 1, 2019

(86) PCT No.: PCT/KR2019/007942
§ 371 (c)(1),
(2) Date: Jan. 21, 2021

(87) PCT Pub. No.: WO2020/022660
PCT Pub. Date: Jan. 30, 2020

(65) Prior Publication Data
US 2021/0297997 A1    Sep. 23, 2021

(30) Foreign Application Priority Data

Jul. 25, 2018 (KR) .................. 10-2018-0086847

(51) Int. Cl.
*H04W 72/04* (2023.01)
*H04W 76/28* (2018.01)
*H04W 72/0446* (2023.01)

(52) U.S. Cl.
CPC ..... *H04W 72/042* (2013.01); *H04W 72/0446* (2013.01); *H04W 76/28* (2018.02)

(58) Field of Classification Search
CPC  H04W 72/042; H04W 76/28; H04W 76/0446
See application file for complete search history.

(56) References Cited

U.S. PATENT DOCUMENTS

| 2013/0058240 A1 | 3/2013 | Kim et al. |
| 2018/0192436 A1 | 7/2018 | Yi et al. |

(Continued)

OTHER PUBLICATIONS

PCT International Application No. PCT/KR2019/007942, International Search Report dated Oct. 2, 2019, 16 pages.

(Continued)

*Primary Examiner* — Ronald B Abelson
(74) *Attorney, Agent, or Firm* — Lee Hong Degerman Kang & Waimey

(57) ABSTRACT

Disclosed is a method by which a user equipment (UE) configured to a discontinuous reception (DRX) operation receives a physical downlink control channel (PDCCH) in a wireless communication system. Particularly, the method can configure an active time for monitoring the PDCCH based on at least one of a plurality of conditions and receive the PDCCH through PDCCH monitoring occasions allocated within a duration of the active time, wherein the PDCCH monitoring occasions can be differently allocated based on the at least one condition.

15 Claims, 15 Drawing Sheets

(A) CONTROL-PLANE PROTOCOL STACK (B) USER-PLANE PROTOCOL STACK

(56) References Cited

U.S. PATENT DOCUMENTS

2018/0199313 A1* 7/2018 Suzuki .................. H04H 20/30
2021/0266909 A1* 8/2021 Lin ....................... H04W 76/11

OTHER PUBLICATIONS

Huawei, HiSilicon, "Power saving for pending SR of delay-tolerate service," 3GPP TSG-RAN WG2 Meeting AH, R2-1810589 revision R2-1808476, Jul. 2018, 2 pages.

Oppo, et al., "UE behavior on DRX timer operation," 3GPP TSG-RAN2 #101, R2-1801763 resubmission of R2-1800073, Feb.-Mar. 2018, 7 pages.

3rd Generation Partnership Project (3GPP), "Technical Specification Group Radio Access Network; NR; User Equipment (UE) radio access capabilities (Release 15)," 3GPP TS 38.306 V15.2.0, Jun. 2018, 28 pages.

Oppo, et al., "UE behavior on DRX timer operation," 3GPP TSG-RAN2 #101, R2-1801763 resubmission of R2-10800073, Feb.-Mar. 2018, 7 pages.

* cited by examiner (A) CONTROL-PLANE PROTOCOL STACK (B) USER-PLANE PROTOCOL STACK

METHOD FOR TRANSMITTING AND RECEIVING DOWNLINK CONTROL CHANNEL, AND APPARATUS THEREFOR

CROSS-REFERENCE TO RELATED APPLICATIONS

This application is the National Stage filing under 35 U.S.C. 371 of International Application No. PCT/KR2019/007942, filed on Jul. 1, 2019, which claims the benefit of earlier filing date and right of priority to Korean Application No. 10-2018-0086847, filed on Jul. 25, 2018, the contents of which is hereby incorporated by reference herein in its entirety.

TECHNICAL FIELD

The present disclosure relates to a method and apparatus for transmitting and receiving a downlink control channel, and more particularly, to a method and apparatus for transmitting and receiving a downlink control channel based on a discontinuous reception (DRX) operation.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving a downlink control channel.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving a physical downlink control channel (PDCCH) by a user equipment (UE) configured to a discontinuous reception (DRX) operation in a wireless communication system may include configuring an active time to monitor the PDCCH based on at least one of a plurality of conditions, and receiving the PDCCH in PDCCH monitoring occasions allocated within the duration of the active time. The PDCCH monitoring occasions may be allocated differently based on the at least one condition.

The PDCCH monitoring occasions may occur less often when the at least one condition is an on duration timer than when the at least one condition is an inactivity timer.

Further, a first downlink control information (DCI) format received in a first duration among a durations of the active time may be different from a second DCI format received in a second duration among the duration of the active time.

Further, the first duration may precede the second time period, the first DCI format may be fallback DCI, and the second DCI format may be fallback DCI or non-fallback DCI.

Further, the type of a search space allocated within the duration of the active time may be based on the at least one condition.

Further, DCI informing a slot format for a predetermined duration may also be received during a duration other than the active time.

Further, the UE is communicable with at least one of another UE, a network, abase station (BS), or an autonomous driving vehicle.

In another aspect of the present disclosure, an apparatus configured to a DRX operation to receive a PDCCH in a wireless communication system may include at least one processor, and at least one memory operatively coupled to the at least one processor and storing instructions which when executed, cause the at least one processor to perform operations. The operations may include configuring an active time to monitor the PDCCH based on at least one of a plurality of conditions, and receiving the PDCCH in PDCCH monitoring occasions allocated within the duration of the active time. The PDCCH monitoring occasions may be allocated differently based on the at least one condition.

The PDCCH monitoring occasions may occur less often when the at least one condition is an on duration timer than when the at least one condition is an inactivity timer.

Further, a first downlink control information (DCI) format received in a first time period may be different from a second DCI format received in a second time period, in the duration of the active time.

Further, the first time period may precede the second time period, the first DCI format may be fallback DCI, and the second DCI format may be fallback DCI or non-fallback DCI.

Further, the type of a search space allocated within the duration of the active time may be based on the at least one condition.

Further, DCI indicating a slot format for a predetermined time period may also be received during a time period other than the active time.

Further, the apparatus is communicable with at least one of a UE, a network, a BS, or an autonomous driving vehicle other than the apparatus.

In another aspect of the present disclosure, a UE configured with a DRX operation to receive a PDCCH in a wireless communication system may include at least one transceiver, at least one processor, and at least one memory operatively coupled to the at least one processor and storing instructions which when executed, cause the at least one processor to perform operations. The operations may include configuring an active time to monitor the PDCCH based on at least one of a plurality of conditions, and receiving the PDCCH in PDCCH monitoring occasions allocated within the duration of the active time. The PDCCH monitoring occasions may be allocated differently based on the at least one condition.

In another aspect of the present disclosure, a method of transmitting a PDCCH by a BS supporting a DRX operation in a wireless communication system may include transmitting the PDCCH in PDCCH monitoring occasions allocated within the duration of an active time. The PDCCH monitoring occasions may be allocated differently based on at least one condition related to configuration of the active time among a plurality of conditions.

In another aspect of the present disclosure, a BS supporting a DRX operation to transmit a PDCCH in a wireless communication system may include at least one transceiver, at least one processor, and at least one memory operatively coupled to the at least one processor and storing instructions which when executed, cause the at least one processor to perform an operation. The operation may include transmitting the PDCCH in PDCCH monitoring occasions allocated within the duration of an active time. The PDCCH monitoring occasions may be allocated differently based on at least one condition related to configuration of the active time among a plurality of conditions.

Advantageous Effects

According to the present disclosure, a user equipment (UE) configured with discontinuous reception (DRX) may efficiently receive a physical downlink control channel (PDCCH) according to an active time generation condition.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
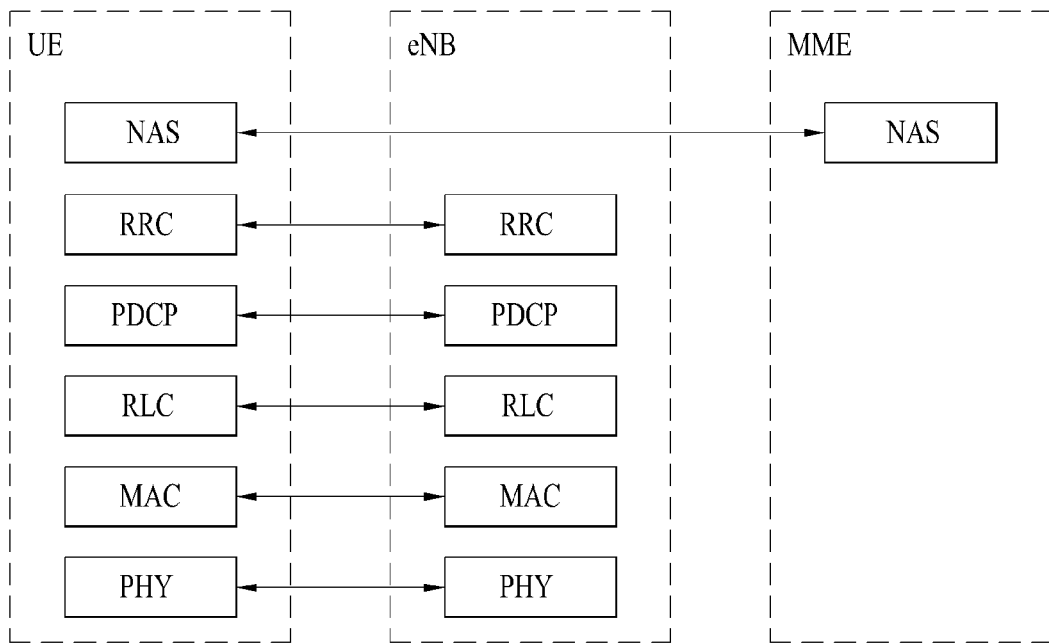
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
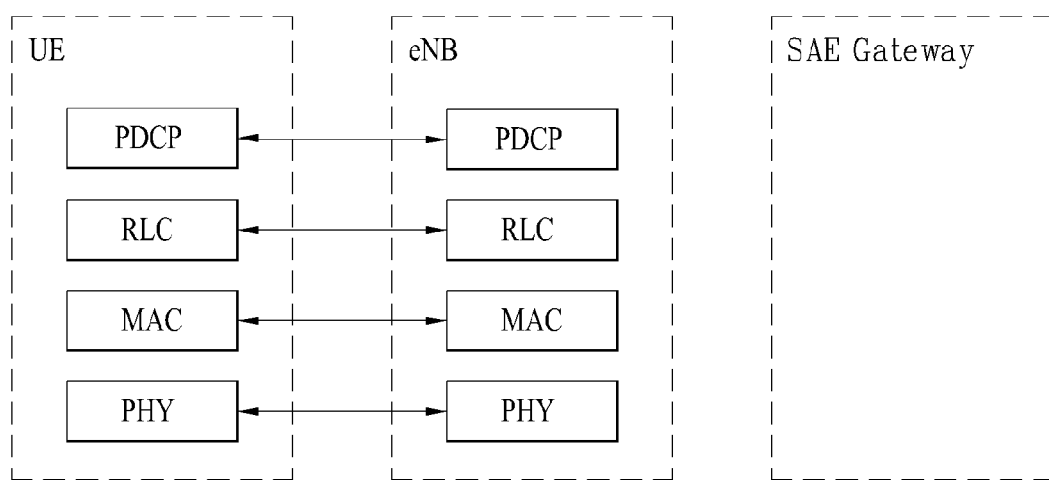

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE), LTE-advanced (LTE-A) and New Radio (NR) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

<Artificial Intelligence (AI)>

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

<Robot>

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

<Autonomous Driving (Self-Driving)>

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

<Extended Reality (XR)>

Extended reality generically refers to virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations.

Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
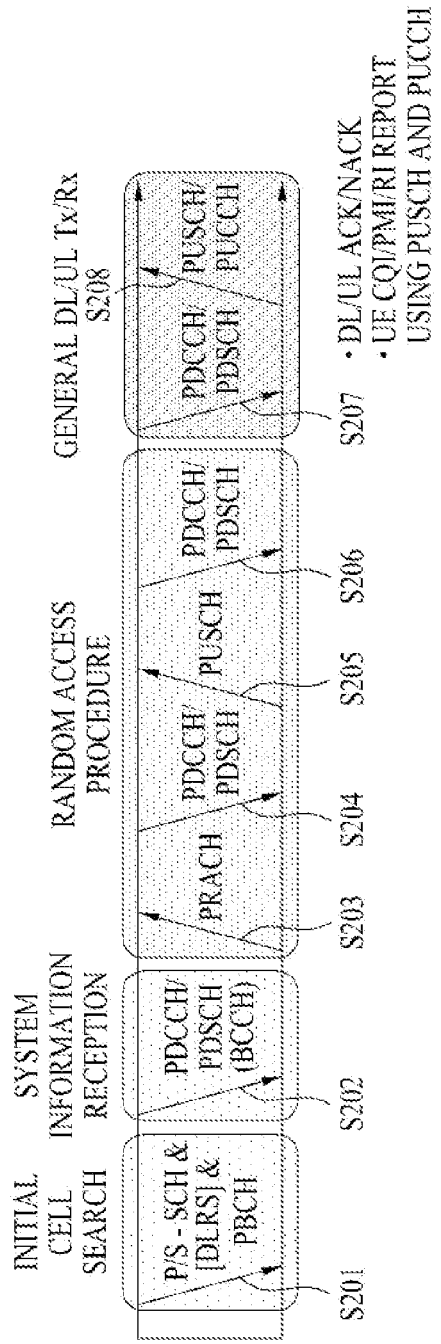
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters anew cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
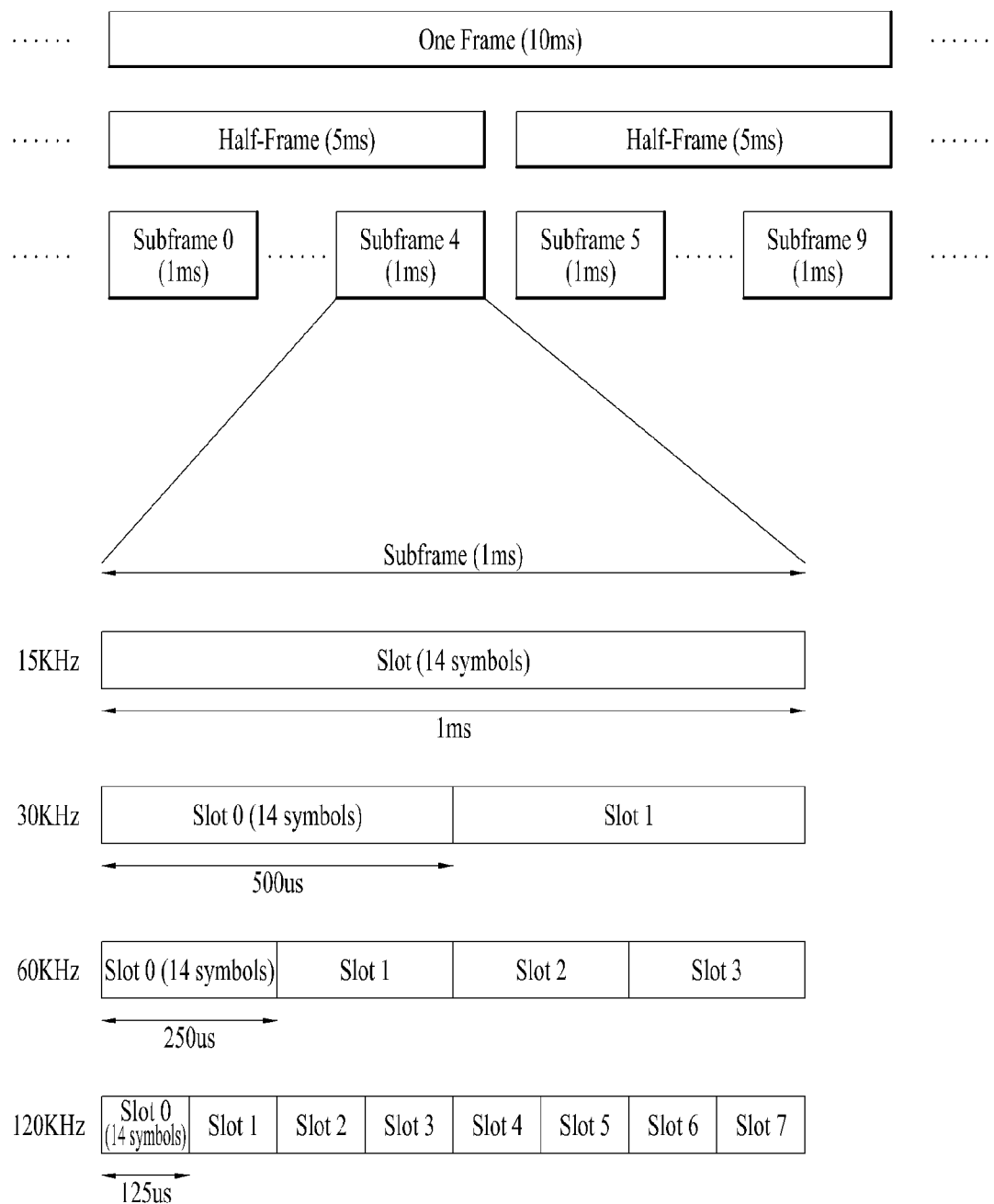
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS ($15*2^u$) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N_{symb}^{slot}$: Number of symbols in a slot
*$N_{slot}^{frame, u}$: Number of slots in a frame
*$N_{slot}^{subframe, u}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

Figure 4:
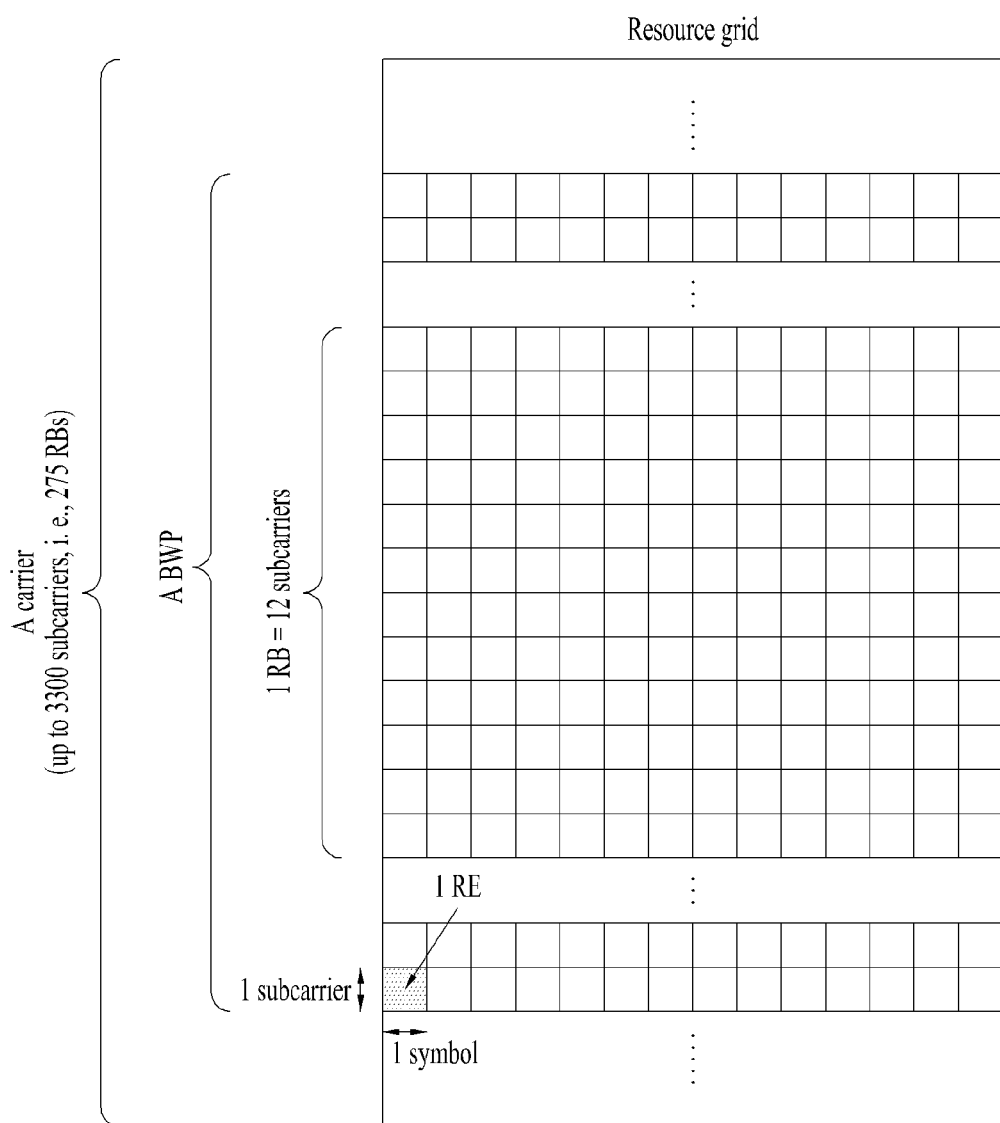

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
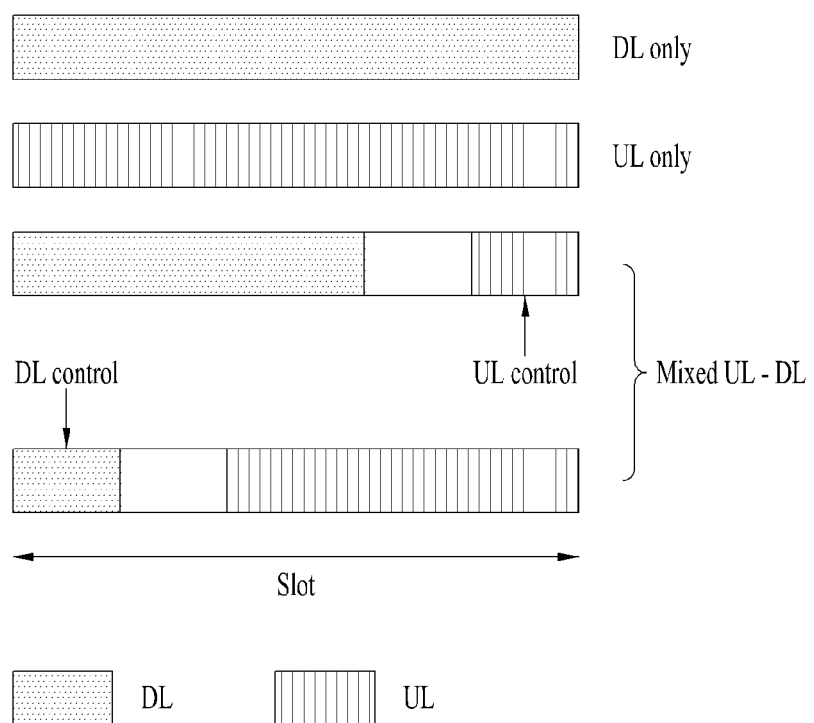

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 6:
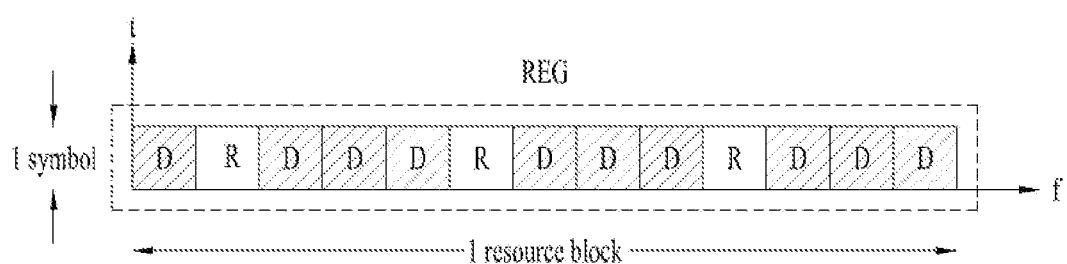
FIGS. 6, 7 and 8 are diagrams illustrating a physical downlink control channel (PDCCH) in the NR system.

FIG. 6 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figure 7:
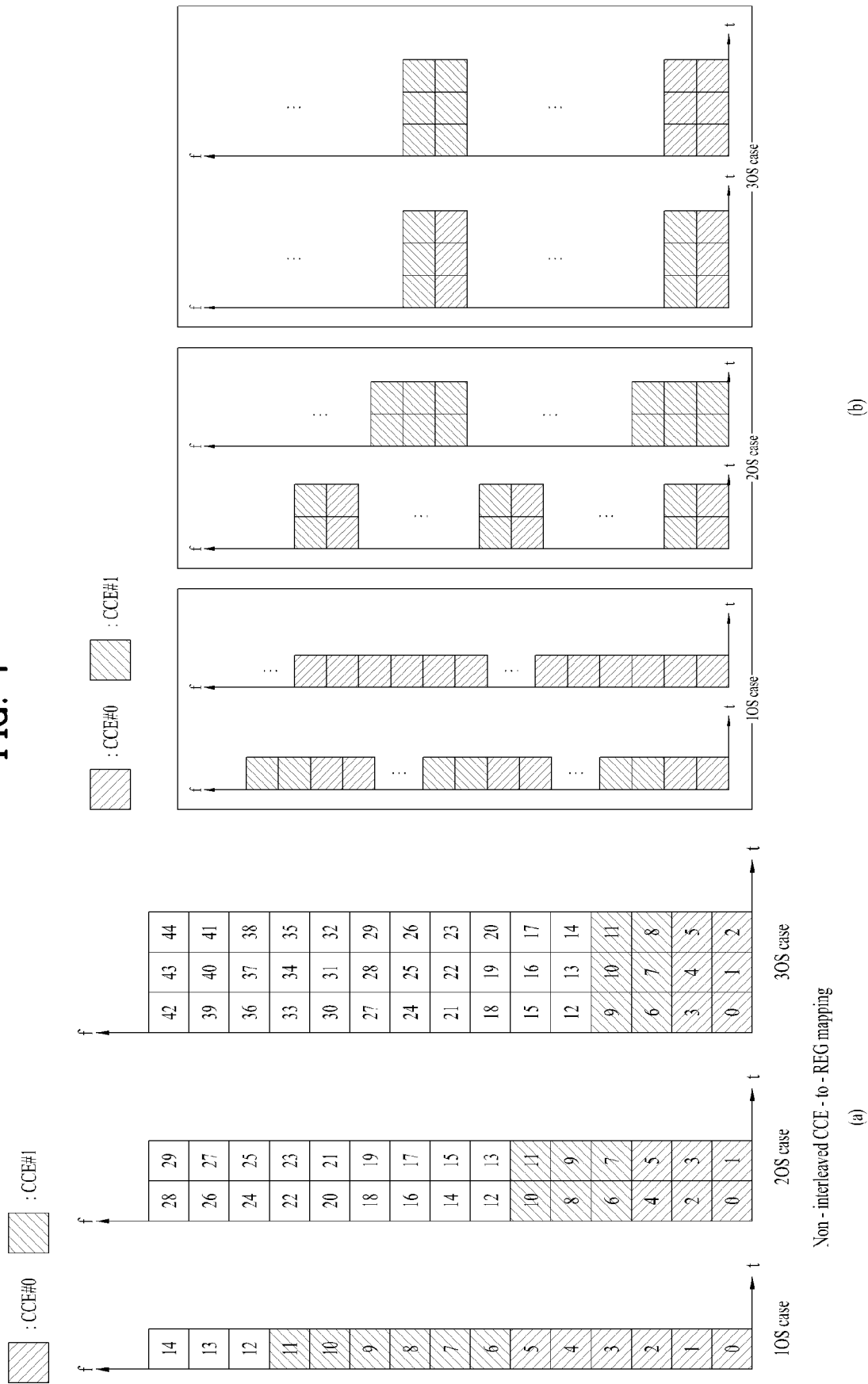

CCE-to-REG mapping for the CORESET may be an interleaved type or a non-interleaved type. FIG. 7(a) is an exemplary view illustrating non-interleaved CCE-REG mapping, and FIG. 7(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 8:
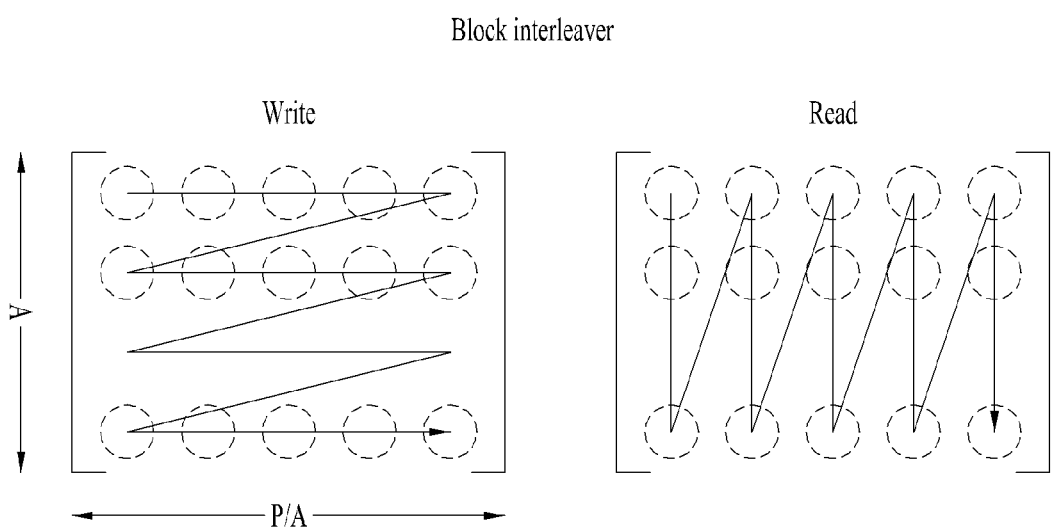
Figure 12:
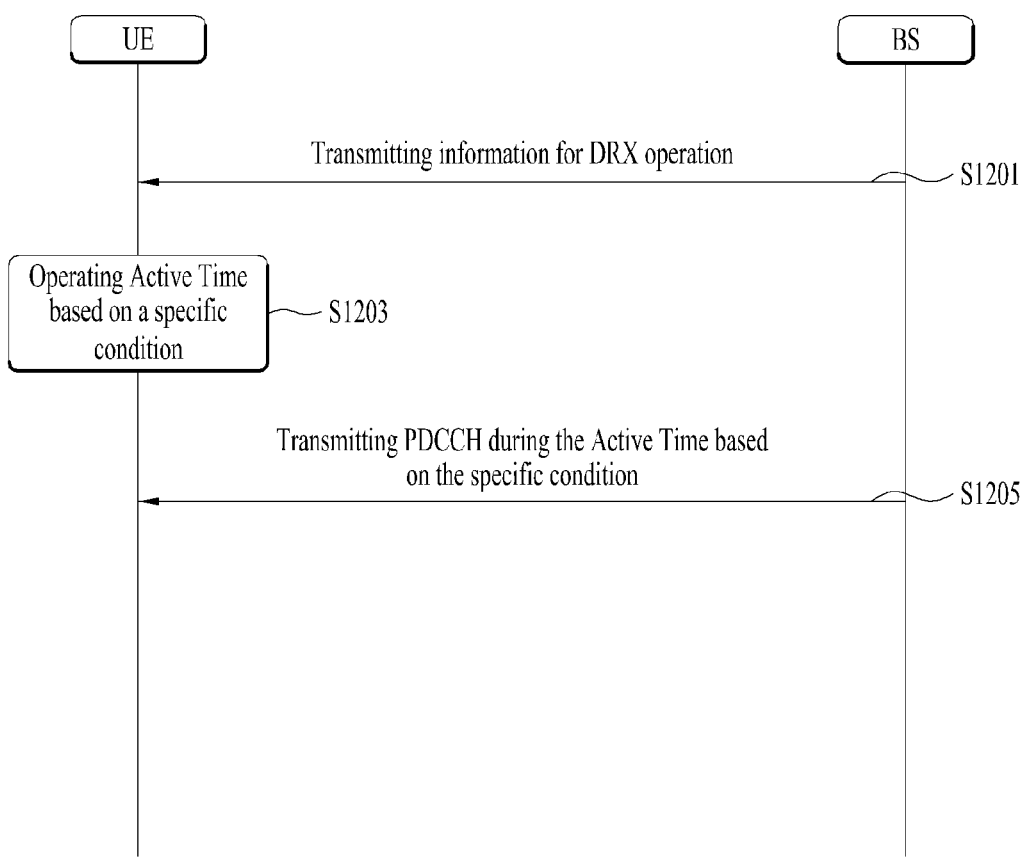

FIG. 8 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 12. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 3 lists exemplary features of the respective search space types.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 lists exemplary DCI formats transmitted on the PDCCH.

TABLE 4

| DCI format | Usage |
|---|---|
| 0_0 | Scheduling of PUS CH in one cell |
| 0_1 | Scheduling of PUS CH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

Bandwidth Part (BWP)

The NR system may support up to 400 MHz per carrier. If a UE operating in such a wideband carrier always keeps a radio frequency (RF) module on for the whole carrier, the UE may suffer from great battery consumption. Considering multiple use cases (e.g., eMBB, URLLC, mMTC, V2X, etc.) in one wideband carrier, different numerologies (e.g., subcarrier spacings) may be supported for different frequency bands of the carrier. Each UE may have a different capability regarding a maximum bandwidth. In this regard, an eNB may indicate a UE to operate only in a part of the bandwidth of the wideband carrier, not across the total bandwidth. Such a partial bandwidth is referred to as a BWP. A BWP is a subset of contiguous common resource blocks defined for numerology $\mu_i$ in BWP i in the frequency domain, and one numerology (e.g., subcarrier spacing, CP length, or slot/mini-slot duration) may be configured for the BWP.

The gNB may configure one or more BWPs in one carrier configured for the UE. If UEs are concentrated in a specific BWP, some UEs may be switched to another BWP, for load balancing. For frequency-domain inter-cell interference cancellation between adjacent cells, BWPs at both ends of the total bandwidth of a cell except for some center spectrum may be configured in the same slot. That is, the gNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

Discontinuous Reception (DRX)

A UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Figure 9:
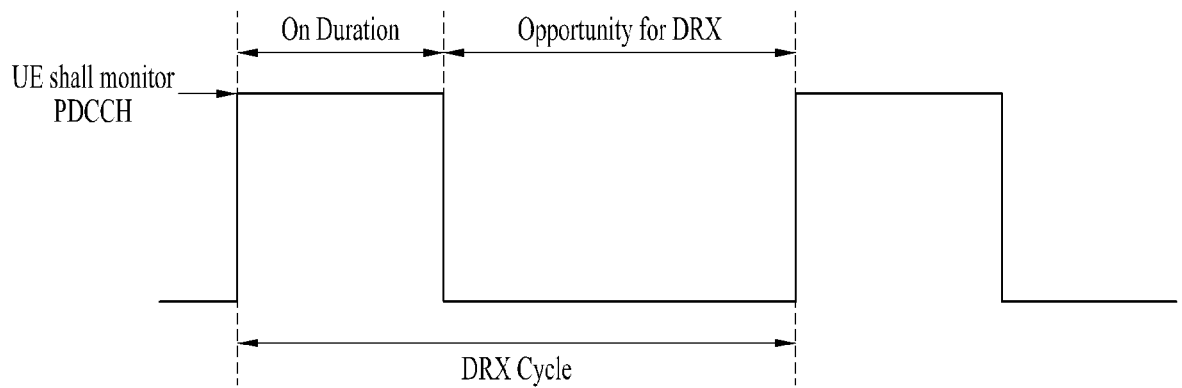
FIG. 9 is a diagram illustrating an embodiment of a discontinuous reception (DRX) operation.

FIG. 9 illustrates a DRX cycle (in the RRC_CONNECTED state).

Referring to FIG. 9, a DRX cycle includes an On Duration and an Opportunity for DRX. The DRX cycle defines the time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH search spaces) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 5 describes a DRX operation of a UE (in the RRC_CONNECTED state). Referring to Table U1, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 9.

TABLE 5

|  | Type of signals | UE procedure |
| --- | --- | --- |
| 1$^{st}$ step | RRC signalling(MAC-CellGroupConfig) | Receive DRX configuration information |
| 2$^{nd}$ Step | MAC CE((Long) DRX command MAC CE) | Receive DRX command |
| 3$^{rd}$ Step | — | Monitor a PDCCH during an On Duration of a DRX cycle |

MAC-CellGroupConfig contains configuration information required to configure MAC parameters for a cell group. MAC-CellGroupConfig may also contain DRX configuration information. For example, MAC-CellGroupConfig may contain the following information for defining DRX.—
Value of drx-onDurationTimer: Defines the duration of a time period at the beginning of a DRX cycle.
  Value of drx-InactivityTimer: Defines the duration of a time period during which the UE is awake after a PDCCH occasion in which a PDCCH indicates an initial UL or DL user data transmission for the UE.
  Value of drx-HARQ-RTT-TimerDL: Defines the duration of a maximum time period until a DL retransmission is received after reception of a DL initial transmission.
  Value of drx-HARQ-RTT-TimerDL: Defines the duration of a maximum time period until a grant for a UL retransmission is received after reception of a grant for a UL initial transmission.
  drx-LongCycleStartOffset: Defines the duration and starting time of a DRX cycle.
  drx-ShortCycle (optional): Defines the duration of a short DRX cycle.
  When any one of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

In the NR system, PDCCH monitoring may be performed at a different time position according to a CORESET configuration and a search space configuration. The UE may be configured with one or more CORESETs and/or search spaces, and perform PDCCH monitoring at a slot position and/or a symbol position indicated by each of the configurations.

However, continuous PDCCH blind decoding from a configured PDCCH monitoring time may be inefficient in terms of complexity and UE power consumption, depending on traffic properties such as the arrival rate and/or latency requirement of packets.

Further, a time period (hereinafter, referred to an active time) during which the UE performs PDCCH monitoring in a DRX operation may vary according to conditions such as whether a PDCCH has been detected, whether an HARQ has been successful for a PDSCH or PUSCH scheduled by a PDCCH, and an SR pending state.

For example, the UE may perform PDCCH monitoring during an On Duration defined by drx-onDurationTimer according to a short DRX cycle or long DRX cycle configured by a higher layer. When the UE fails in detecting a PDCCH, the UE may return to a sleep mode, thereby saving power.

Upon detection of a PDCCH indicating a new DL or UL signal during the On Duration, the UE may continue the PDCCH monitoring to detect another PDCCH during an inactivity time specified by drx-InactivityTimer. Upon detection of a PDCCH indicating a new DL or UL signal again, the UE may continue the PDCCH monitoring during the inactivity time.

In the DRX operation, the UE may perform PDCCH monitoring during a time period in which reception of retransmission DCI is expected in each HARQ process. For example, when an HARQ-ACK for an initial DL transmission is NACK, the UE may monitor a PDCCH during a DL retransmission time period specified by drx-RetransmissionTimerDL after a round trio time (RTT). Alternatively, when an initial UL transmission has been performed, the UE may monitor a PDCCH during a UL retransmission time period specified by drx-RetransmissionTimerUL after an RTT.

Further, even when ra-ContentionResolutionTimer is running, when an SR is transmitted on a PUCCH and is pending, or when the UE fails to receive a PDCCH addressed to a C-RNTI after receiving a random access response (RAR), the UE may continue PDCCH monitoring.

A time period during which the PDCCH monitoring is performed may be indicated as an active time in a DRX operation. However, there is no restriction on a monitoring target such as a DCI format, a CORESET, or a search space in the active time. That is, any DCI format, any CORESET type, and any search space type are allowed to be transmitted in a specific active time without restriction.

However, when the UE performs PDCCH monitoring and detection equally in active times generated according to different conditions, the UE may eventually perform too many unnecessary PDCCH monitorings. As a result, the UE may suffer from excessive power consumption in PDCCH monitoring or blind decoding.

In this context, the present disclosure proposes a method of efficiently performing PDCCH monitoring in an active time according to a traffic environment and/or a UE state. While the present disclosure is described in the context of PDCCH monitoring for the convenience of description, the scope of the present disclosure may be extended to another UE operation such as measurement/reporting.

When DRX is configured by a higher layer, the UE may monitor a PDCCH in an active time. Further, periodic CSI reporting and/or periodic SRS transmission may also be performed during an active time or an on duration time. The active time may be configured:

(Condition 1) when drx-onDurationTimer is running; or
(Condition 2) when drx-InactivityTimer is running; or
(Condition 3) when drx-RetransmissionTimerDL is running; or
(Condition 4) when drx-RetransmissionTimerUL is running; or
(Condition 5) when ra-ContentionResolutionTimer is running; or
(Condition 6) when an SRS is transmitted on a PUCCH and is pending; or
(Condition 7) when the UE fails in successfully receiving a PDCCH indicating a new transmission addressed to a C-RNTI after receiving an RAR.

Different PDCCH monitoring methods may be suitable for an active time according to (Condition 1) to (Condition 7). That is, a suitable PDCCH monitoring method for an active time may be configured independently according to (Condition 1) to (Condition 7). For example, a different DCI format, a different CORESET, and/or a different search space may become a PDCCH monitoring target according to (Condition 1) to (Condition 7).

Additionally, a different measurement configuration (e.g., a configuration for CSI measurement and feedback) may be applied to an active time according to (Condition 1) to (Condition 7).

For example, when the UE receives a PDSCH and fails in decoding data for an HARQ process corresponding to the PDSCH, the UE waits for DCI that schedules a retransmission of the data in an active time specified by drx-RetransmissionTimerDL. Accordingly, it may be efficient for the UE to attempt to detect only DL assignment DCI in this case. However, this operation may be limited to a case in which UL traffic is not expected through SR transmission. Further, when an active time takes place due to SR pending, it may be efficient to detect only UL grant DCI.

Accordingly, a specific example of a PDCCH monitoring method according to each active time generation condition will be proposed below. If an active time is generated according to a plurality of conditions, PDCCH monitoring may be performed in a combination of PDCCH monitoring methods corresponding to the conditions. Otherwise, upon occurrence of an active time, a default set in which PDCCH monitoring is attempted may be predefined or configured by a higher layer, irrespective of the active time generation conditions. For example, the default set may be a full or partial common search space (CSS).

Further, the following specific examples of the PDCCH monitoring methods may be applied on a slot basis or on an absolute time basis such as 1 ms or 0.5 ms, and may be interpreted as skipping PDCCH monitoring in a full or partial CORESET/search space set configured for PDCCH monitoring in each slot by the network according to the following embodiments.

Overall operations of a UE, a BS, and a network for performing an implementation example of a PDCCH monitoring method corresponding to each active time generation condition will be described below with reference to FIGS. 10, 11, and 12.

Figure 10:
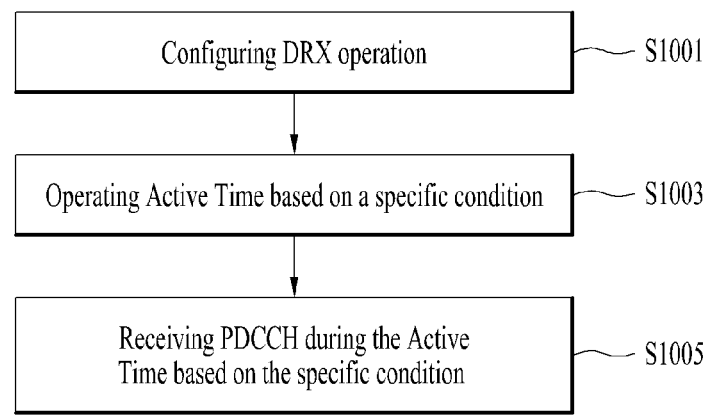
FIGS. 10, 11 and 12 are diagrams illustrating an implementation example of a UE, a base station (BS), and a network according to an embodiment of the present disclosure.

FIG. 10 is a flowchart illustrating a UE operation according to an embodiment of the present disclosure.

Referring to FIG. 10, a UE may be configured to perform a DRX operation (S1001), may enable an active time according to (Condition 1) to (Condition 7) (S1003), and may monitor a PDCCH during the enabled active time according to (Condition 1) to (Condition 7) (S1005). An embodiment of monitoring a PDCCH during an active time enabled by at least one of (Condition 1) to (Condition 7) may be based on the following description.

Figure 11:
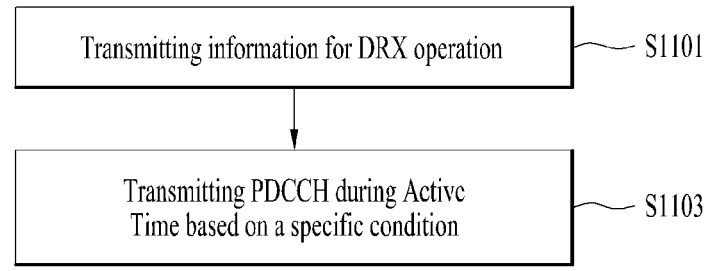

FIG. 11 is a flowchart illustrating a BS operation according to an embodiment of the present disclosure.

Referring to FIG. 11, a BS may transmit, to a UE, information indicating to the UE to perform a DRX operation (S1101), and transmit a PDCCH during an active time generated by at least one of (Condition 1) to (Condition 7) (S1103). An embodiment of transmitting a PDCCH during an active time generated by at least one of (Condition 1) to (Condition 7) may be based on the following description. For example, from the perspective of the BS, methods of monitoring a PDCCH during an active time enabled by at least one of (Condition 1) to (Condition 7) may be interpreted as methods of transmitting a PDCCH during an active time generated by at least one of (Condition 1) to (Condition 7).

FIG. 12 is a diagram illustrating a network operation according to an embodiment of the present disclosure.

Referring to FIG. 12, a BS may configure a DRX operation for a UE by transmitting, to the UE, information indicating to the UE to perform the DRX operation (S1201). The UE may then enable an active time according to (Condition 1) to (Condition 7) (S1203). The BS may transmit a PDCCH during the active time generated by at least one of (Condition 1) to (Condition 7), and the UE may monitor the PDCCH during the active time enabled according to (Condition 1) to (Condition 7) (S1205). An embodiment of monitoring a PDCCH during an active time enabled by at least one of (Condition 1) to (Condition 7) and/or a method of transmitting a PDCCH during an active time generated based on at least one of (Condition 1) to (Condition 7) may be based on the following description. For example, from the perspective of the BS, methods of monitoring a PDCCH during an active time enabled by at least one of (Condition 1) to (Condition 7) may be interpreted as methods of transmitting a PDCCH during an active time generated by at least one of (Condition 1) to (Condition 7).

1. Condition 1: When an active time is generated by drx-onDurationTimer (1) Embodiment 1-1: DL assignment DCI is monitored. In general, after the UE transmits an SR to the BS, the BS may transmit a UL grant for UL data to the UE. Therefore, the UE may save power consumed for PDCCH blind decoding by not monitoring a UL grant during an on duration time.

However, when the size of specific DCI (e.g., DCI format 1_0) for a DL assignment is equal to the size of specific DCI (e.g., DCI format 0_0) for a UL grant, the UE may still monitor and receive the specific DCI for a UL grant. For example, once DCI format 1_0 and DCI format 0_0 are decoded, they are distinguished from each other by the value of a DCI field. Therefore, the BS may advantageously indicate a UL transmission, without causing UE power consumption for blind decoding to detect DCI format 1_0 and DCI format 0_0 and an SR transmission from the UE.

However, since the BS may not trigger aperiodic CSI, DL throughput may be reduced in Embodiment 1-1. To alleviate this problem, aperiodic CSI triggering and/or semi-persistent CSI activation may be allowed by specific DCI that may be monitored at least during an on duration time, such as DL assignment DCI and/or DCI format 0_0. In this case, the DCI size of DL assignment DCI and/or DCI format 0_0 which is detectable in an active time according to Embodiment 1-1 may be different from that in a general case. For example, the sum of the size of DCI format 0_0 as defined in the standards and the size of an aperiodic CSI triggering field may be used in Embodiment 1-1.

Embodiment 1-2: PDCCH monitoring may be performed for fallback DCI such as DCI format 1_0 and/or DCI format 0_0. An on duration time may generally exist at the beginning of an active time. Therefore, CSI for the on duration time may not be accurate. Particularly, the inaccuracy of CSI may increase at the beginning of the on duration time.

Accordingly, DL data reception and/or UL data transmission based on fallback DCI at the beginning of the active time may be considered. In other words, Embodiment 1-2 may be always applied when Condition 1 is satisfied, or a time period to which Embodiment 1-2 is applied may be limited to a specific time period within an active time that satisfies Condition 1 according to an additional condition. For example, Embodiment 1-2 may be applied restrictively to a case in which CSI is not reported for a predetermined time before drx-onDurationTimer runs. In Embodiment 1-2, DCI format 0_1 may be monitored in addition to the fallback DCI, for aperiodic CSI triggering.

(3) Embodiment 1-3: PDCCH monitoring may be performed for non-fallback DCI such as DCI format 1_1 and/or DCI format 0_1. For example, when a default set monitored during an active time is a CSS, the fallback DCI may be detected basically in the CSS. Accordingly, the non-fallback DCI is preferably monitored first in a UE-specific search space (USS).

(4) Embodiment 1-4: PDCCH monitoring may be performed in all or a part of CORESETs or search spaces. According to Embodiment 1-4, when a PDCCH is not actually transmitted during an on duration time, an energy saving mode may be entered fast, and power consumption for PDCCH blind decoding during the on duration time may be reduced. For example, a PDCCH corresponding to a CORESET having the lowest index or a CORESET having the lowest of the indexes of CORESETs for a USS may be monitored in during the on duration time. Alternatively, only a PDCCH corresponding to a CSS or only a PDCCH corresponding to a USS may be monitored.

Alternatively, at least one CORESET having a high priority or at least one search space set having a high priority among resources corresponding to Condition 1 may be monitored in Embodiment 1-4. For example, when prioritization is based on the indexes of search space sets, PDCCH monitoring may be performed only in a CORESET associated with a search space set with the highest or lowest index. For prioritization for Condition 1, a CORESET ID, the number of search space set candidates, a PDCCH monitoring periodicity, a search space type (e.g., CSS or USS), and a PDCCH monitoring occasion in a slot may be considered in addition to a search space set index.

Embodiment 1-1 to Embodiment 1-4 based on Condition 1 may be limited to a case in which an active time is generated only by drx-onDurationTimer. That is, when the active time is generated by drx-onDurationTimer and a timer other than drx-onDurationTimer, PDCCH monitoring may be performed according to a condition and embodiment which correspond to the other timer as described below.

For example, when an active time is generated by drx-onDurationTimer and drx-InactivityTimer, PDCCH monitoring may be performed based on Embodiment 2-1 to Embodiment 2-4 described later.

2. Condition 2: When an active time is generated by drx-InactivityTimer (1) Embodiment 2-1: DL assignment DCI may be monitored. In general, after a UE transmits an SR to a BS, the BS may transmit a UL grant for UL data to the UE.

In this case, when the size of specific DCI for a DL assignment such as DCI format 10 is equal to the size of specific DCI for a UL grant such as DCI format 0_0, the UE may still receive the DCI for a UL grant such as DCI format 00 during an active time.

In Embodiment 2-1, however, the BS may not trigger aperiodic CSI, thus reducing DL throughput. To alleviate this problem, aperiodic CSI triggering and/or semi-persistent CSI activation may be allowed by specific DCI that may be monitored at least during an on duration time, such as DL assignment DCI and/or DCI format 0_0.

(2) Embodiment 2-2: Fallback DCI such as DCI format 1_0 and/or DCI format 0_0 may be monitored. Further, for aperiodic CSI triggering, DCI format 0_1 may be monitored in addition to the fallback DCI.

(3) Embodiment 2-3: All DCI formats may be monitored. When the UE receives a PDCCH indicating a new DL or UL transmission and reception even after an on duration time, an inactivity time may be configured. In general, a PDCCH indicating another new DL or UL transmission and reception for a different HARQ process may be monitored continuously within the inactivity time. Since it may be expected that CSI is more accurate in this inactivity time, the UE may monitor all DCI formats, for full functionality.

(4) Embodiment 2-4: PDCCH monitoring may be performed in all or a part of CORESETs or search spaces. A different CORESET and/or a different search space may be subjected to PDCCH monitoring during an on duration time. For example, some search spaces may be monitored during an on duration time, and all CORESTs and/or all search spaces may be monitored during an inactivity time.

3. Condition 3: When an active time is generated by drx-RetransmissionTimerDL (1) Embodiment 3-1: PDCCH monitoring may be performed for DL assignment DCI. The timer drx-RetransmissionTimerDL runs on an HARQ process basis, when the UE receives DCI that schedules a PDSCH and then fails in decoding corresponding data. In a time period specified by drx-RetransmissionTimerDL, DCI for DL data retransmission may be detected. Accordingly, it may be efficient to first detect DL assignment DCI in the time period.

(2) Embodiment 3-2: PDCCH monitoring is performed for a DCI format that schedules an initial transmission corresponding to a drx-RetransmissionTimerDL operation. For example, when DL data of an HARQ process corresponding to the timer drx-RetransmissionTimerDL was previously scheduled by DCI format 11, PDCCH monitoring may also be performed for DCI format 1_1 in an active time specified by. drx-RetransmissionTimerDL. However, Embodiment 3-2 may be limited to a case in which two transport blocks (TBs) may be scheduled or was scheduled by DCI format 1_1.

(3) Embodiment 3-3: PDCCH monitoring may be performed for all or a part of CORESETs or search spaces. A CORESET or search space subject to PDCCH monitoring in an active time based on drx-RetransmissionTimerDL may be different from a CORESET and/or search space subject to PDCCH monitoring in an active time based on an on duration. Further, the CORESET or search space subject to PDCCH monitoring in the active time based on drx-RetransmissionTimerDL may be the same as a CORESET and/or a search space subject to PDCCH monitoring during an inactivity time.

4. Condition 4: When an active time is generated by drx-RetransmissionTimerUL (1) Embodiment 4-1: PDCCH monitoring may be performed for UL grant DCI. The timer drx-RetransmissionTimerUL runs on an HARQ process basis, after the UE transmits a PUSCH. In a time period specified by drx-RetransmissionTimerUL, retransmission DCI for UL data may be detected. Accordingly, it may be efficient to first detect UL grant DCI in the time period.

(2) Embodiment 4-2: PDCCH monitoring may be performed for a DCI format that schedules an initial transmission corresponding to a drx-RetransmissionTimerUL operation. For example, when UL data of an HARQ process corresponding to the timer drx-RetransmissionTimerUL was previously scheduled by DCI format 01, PDCCH monitoring may also be performed for DCI format 0_1 in an active time based on drx-RetransmissionTimerUL. In the case of configured scheduling, PDCCH monitoring may be performed for a DCI format used for an activation PDCCH during a time period in which DCI retransmission is expected.

(3) Embodiment 4-3: PDCCH monitoring may be performed for all or a part of CORESETs or search spaces. A CORESET or search space subject to PDCCH monitoring in an active time based on drx-RetransmissionTimerDL may be different from a CORESET and/or search space subject to PDCCH monitoring in an active time based on an on duration. Further, the CORESET or search space subject to PDCCH monitoring in the active time based drx-RetransmissionTimerDL may be the same as a CORESET and/or a search space subject to PDCCH monitoring during an inactivity Time.

5. Condition 5: When an active time is generated by ra-ContentionResolutionTimer The timer ra-ContentionResolutionTimer runs after Msg3 is transmitted, and may specify a time period for scheduling Msg4. Accordingly, a PDCCH for Msg4 may be received in a specific search space such as a Type 1-PDCCH CSS during initial access.

In this case, a DCI format transmitted on a PDCCH to be monitored may be fallback DCI. Therefore, during an active time based on ra-ContentionResolutionTimer, the UE may monitor a PDCCH for fallback DCI, a PDCCH in a CSS like a Type-1 PDCCH CSS, or a PDCCH in a CSS, like fallback DCI. After an RRC connection is established, a CORESET and/or a search space to be monitored may be configured/updated by the higher layer.

6. Condition 6: When an active time is generated by SR which is transmitted and pending (1) Embodiment 6-1: PDCCH monitoring may be performed for UL grant DCI. Since the UE may transmit an SR to receive a UL grant from the BS, the UE may first detect UL grant DCI.

2) Embodiment 6-2: PDCCH monitoring may be performed for all or a part of CORESETs or search spaces. For example, when a CORESET and/or a search space to be monitored for a PDCCH during an active time generated by an SR which is transmitted and then pending may be different from a CORESET and/or a search space to be monitored for a PDCCH during an active time based on an on duration. For example, a CORESET or search space including UL grant DCI or DCI format 0_1 may first be monitored.

7. Condition 7: When an active time is generated by failure in receiving a PDCCH indicating a new transmission addressed to C-RNTI after reception of an RAR Considering initial access, it may be expected that information for RRC connection will be transmitted and received during an active time generated by failure in receiving a PDCCH indicating a new transmission addressed to a C-RNTI after reception of an RAR.

Therefore, PDCCH monitoring may be performed at least for fallback DCI during an active time generated by failure in receiving a PDCCH indicating a new transmission addressed to a C-RNTI after reception of an RAR. Even in the RRC_CONNECTED state, the UE may monitor a PDCCH for fallback DCI, a PDCCH in a CSS such as a Type-1 PDCCH CSS, or a PDCCH in a CSS such as fallback DCI during an active time generated by failure in receiving a PDCCH indicating a new transmission addressed to a C-RNTI after reception of an RAR. After an RRC connection is established, a CORESET and/or a search space to be monitored may be configured/updated by the higher layer.

When a plurality of DCI formats are of the same size, an additional decoding process for the plurality of DCI formats may not generally be required. Each of the plurality of DCI formats may be identified by an RNTI and/or an indicator in a DCI field, after being decoded. In this case, the UE may detect and use even a DCI format that has not been configured for PDCCH monitoring according to an RNTI and/or a DCI field value.

A DCI format and/or a DCI format set which has not been configured for PDCCH monitoring based on a virtual cyclic redundancy check (CRC) may be determined to be invalid or may not be expected to be transmitted.

The above-described (Condition 1) to (Condition 7) may be respectively applied to short DRX and long DRX to generate an active time. Accordingly, a PDCCH monitoring method may be configured/applied differently or independently according to an active time based on the short DRX and an active time based on the long DRX. In the PDCCH monitoring method that may be configured/applied differently or independently, information about a PDCCH set and/or PDCCH monitoring occasions may be configured/applied differently or independently.

For example, the timer values of specific timers such as the on duration and/or inactivity timer may be set independently in the short DRX and the long DRX. In this case, the On Duration may be generated more frequently and increased in duration in anticipation of new traffic in the short DRX, whereas the On Duration may be generated intermittently and decreased in duration in anticipation of generation of no new traffic in the long DRX.

In an example of applying the PDCCH monitoring method differently according to a condition for generating an active time, different PDCCH monitoring occasion information may be configured for PDCCH monitoring. The PDCCH monitoring occasion information may specify a PDCCH monitoring periodicity, an offset for a PDCCH monitoring occasion, and the symbol position of a PDCCH monitoring occasion in a slot.

For example, PDCCH monitoring occasions may be different in an active time generated by Condition X (e.g., an on duration time) and an active time generated by Condition Y (e.g., an inactivity time).

In a specific example, to increase the probability of PDCCH reception within a configured time, the frequency and/or periodicity of PDCCH monitoring occasions may be increased during an on duration time and decreased during an inactivity time. On the contrary, since whether traffic has been generated may not be known during the on duration time, the frequency of PDCCH monitoring occasions may be decreased or the periodicity of PDCCH monitoring occasions may be increased. Then, during the inactivity time, the frequency of PDCCH monitoring occasions may be increased or the periodicity of PDCCH monitoring occasions may be decreased, determining that data scheduling actually starts.

In changing information related to PDCCH monitoring occasions, different search spaces may be used according to timer types or to active time generation conditions, or a specific search space has information related to a plurality of PDCCH monitoring occasions and information related to a specific one of the PDCCH monitoring occasions, among the plurality of PDCCH monitoring occasions may be used according to at least one of (Condition 1) to (Condition 7). Part of information related to a PDCCH monitoring occasion in a search space may be implicitly derived from information related to another PDCCH monitoring occasion in the search space. For example, an odd-numbered or even-numbered PDCCH monitoring occasion may be derived from information related to an even-numbered or odd-numbered PDCCH monitoring occasion, or a multiple of a PDCCH monitoring periodicity configured for a PDCCH monitoring occasion may be applied as information about another PDCCH monitoring occasion. The above PDCCH monitoring method may be used in combination with a different method such as a PDCCH set to be monitored.

The duration of an active time generated according to at least one of (Condition 1) to (Condition 7) may vary, ranging from 1 ms or less to thousands of milliseconds. Therefore, the above-described PDCCH monitoring method based on a specific condition may be inefficient depending on a configured duration of an active time. For example, when the on duration timer is set to several tens of milliseconds, a CSI value may not be accurate due to the absence of periodic CSI at the beginning of an on duration time. However, since accurate CSI may be obtained during most of the on duration time, it may be inefficient to allow only monitoring of a specific DCI format.

Therefore, it may be considered to divide a time period specified by a specific timer or the duration of an active time into a plurality of time periods and configure PDCCH monitoring methods for the respective time periods according to at least one of (Condition 1) to (Condition 7).

For example, the duration of an on duration time at the beginning of each DRX cycle may be divided into two time periods. Then, a PDCCH monitoring method (e.g., information related to a PDCCH set and/or a PDCCH monitoring occasion to be monitored for a PDCCH) may be independently configured for each of the two time periods.

An independent configuration may be generated for each of the time periods divided from the duration of the on duration time. Further, the duration of the on duration time may be divided into the two time periods based on a threshold predefined or configured by higher-layer signaling, and PDCCH monitoring may also be separately performed in each of the two time periods.

For example, since CSI is absent for an initial part of the on duration time and thus CSI accuracy is low as described before, the UE may expect to detect fallback DCI at the beginning of the on duration time, and the BS may transmit the fallback DCI at the beginning of the on duration time. As the on duration time elapses and thus CSI is secured to a certain degree, the BS may transmit fallback DCI and/or non-fallback DCI based on the secured CSI, and the UE may also expect detection of the fallback DCI and/or the non-fallback DCI based on the secured CSI.

The above embodiment has been described in the context of the on duration time, which should not be construed as limiting the present disclosure. The present disclose may also be extended to other timers such as an inactivity timer or other conditions.

During a DRX period, information about a slot format indicator (SFI) transmitted on a group common PDCCH may not be updated according to a DRX configuration for the UE. For example, when the SFI is transmitted every 10 ms and an active time does not match the transmission timing of the SFI, the UE may not receive the information about the SFI unless the UE operates in the active time according to the SFI transmission periodicity. In this case, the UE may perform PDCCH monitoring and/or measurement in the active time more than needed. Therefore, the following methods are proposed to overcome this problem.

Option 1: When a group common PDCCH or a dynamic SFI is configured, it may be assumed that the UE reads the group common PDCCH or the dynamic SFI, assuming that an active time (e.g., On Duration) includes the reception timing of the group common PDCCH or dynamic SFI according to a group common PDCCH configuration. For example, when the group common PDCCH is transmitted every 10 slots and the On Duration starts in slot 10*n+2, it may be assumed that the SFI is transmitted in slot 10*n, which is a 10-slot unit before the start time of the On Duration.

In this case, the UE may become 'active' at least in a slot carrying the group common PDCCH or the dynamic SFI. Accordingly, DL assignment DCI and/or UL grant DCI may also be transmitted in the 'active' slot. However, the above-described transmission method may be limited only to a case in which DCI for SFI transmission and DCI for DL/UL scheduling are of the same size. Alternatively, only the group common PDCCH may be monitored in the 'active' slot. In this regard, the UE may additionally receive a configuration specifying an operation to be performed in the 'active' slot.

Option 2: The UE may not detect a group common PDCCH or a dynamic SFI during a time period other than an active time. Accordingly, the operation of the UE may be based on a case in which the UE fails in detecting the group common PDCCH or the dynamic SFI.

In this case, the UE may perform PDCCH monitoring in semi-static flexible resources. Therefore, when the UE is in the active time through On Duration/InactivityTimer by the DRX operation, the UE may not perform PDCCH monitoring in the semi-static flexible resources. Alternatively, the above-described operation may be limited only to an active time based on InactivityTimer or only to OnDuration. Alternatively, it may be limited only to OnDuration in short DRX or only to OnDuration in long DRX. The above-described operation may not be performed for measurement.

Option 3: Even when DRX is configured, the UE may attempt to detect a group common PDCCH or a dynamic SFI in a PDCCH monitoring occasion configured at a time other than an active time. In general, a long PDCCH monitoring periodicity may be configured for the group common PDCCH. In this case, monitoring the group common PDCCH separately from the DRX operation may not serve as a significant disadvantage in terms of UE complexity and power consumption.

While option 1 to option 3 have been described in the context of a dynamic SFI, they may also be extended to other DCI that does not schedule a PDSCH or a PUSCH. The DCI that does not schedule a PDSCH or a PUSCH may be interruption information and group TPC information.

Figure 13:
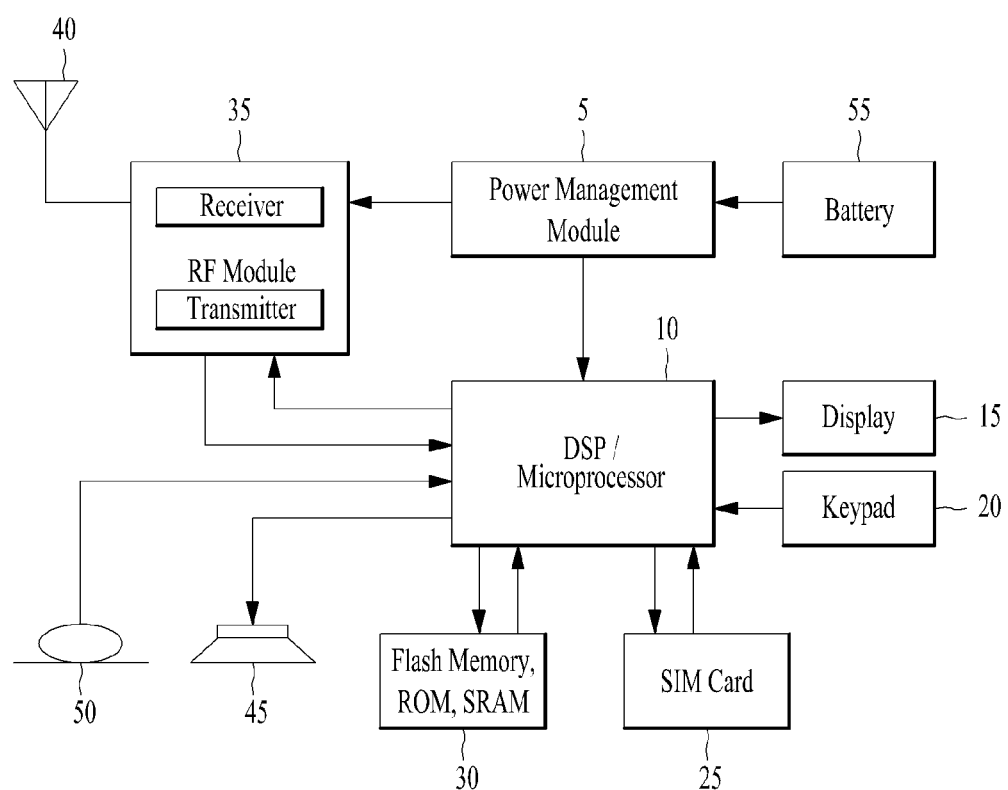
FIG. 13 is a block diagram illustrating components of a wireless device that implements the present disclosure.

FIG. 13 illustrates an example of a wireless communication device according to an embodiment of the present disclosure.

The wireless communication device illustrated in FIG. 13 may represent a UE and/or a BS according to an embodiment of the present disclosure. However, the wireless communication device of FIG. 13 may be replaced with any of various types of devices such as a vehicle communication system or device, a wearable device, and a laptop, not limited to the UE and/or the BS according to the embodiment of the present disclosure. More specifically, the wireless communication device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an AR device, a VR device, an MTC device, an IoT device, medical equipment, a FinTech device (or financial device), a security device, a weather/environmental device, and a device related to $4^{th}$ industrial revolution fields or 5G services. For example, the UAV may be an unmanned aircraft flying according to a wireless control signal. For example, the MTC device and the IoT device do not need direct human intervention or manipulation, including a smart meter, a vending machine, a thermometer, a smart bulb, a door lock, and various sensors. For example, the medical equipment refers to a device designed to diagnose, remedy, alleviate, treat, or prevent diseases or a device that examines, replaces or modifies a structure or function, including diagnosis equipment, a surgery device, an (in vitro) diagnostic kit, a hearing aid, and a procedure device. For example, the security device is installed to prevent probable dangers and maintain safety, including a camera, a closed-circuit television (CCTV), and a black box. For example, the FinTech device is a device that provides financial services such as mobile payment, including a payment device and point of sales (POS) terminal. For example, the weather/environmental device may refer to a device that monitors and predicts weather/environment.

Further, the transmitting UE and the receiving UE may include a portable phone, a smartphone, a laptop computer, a digital broadcasting terminal, a personal digital assistant (PDA), a portable multimedia player (PMP), a navigator, a slate personal computer (PC), a tablet PC, an ultrabook, a wearable device (e.g., a smart watch, smart glasses, a head-mounted display (HMD)), and a foldable device. For example, the HMD is a display device wearable on the head, which may be used to implement VR or AR.

In the example of FIG. 13, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods described with reference to FIGS. 1 to 26. In at least some of the embodiments described with reference to FIGS. 1 to 26, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 13 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

Specifically, when the wireless communication device illustrated in FIG. 13 is a UE according to an embodiment of the present disclosure, a UE operation will be described in order to implement the embodiments of the present disclosure. When the wireless communication device is a UE according to an embodiment of the present disclosure, the processor 10 may control the transceiver 35 to perform a DRX operation, enable an active time according to (Condition 1) to (Condition 7), and monitor a PDCCH during the active time enabled according to (Condition 1) to (Condition 7). An embodiment of monitoring a PDCCH within an active time enabled according to at least one of (Condition 1) to (Condition 7) may be based on the afore-described proposals.

When the wireless communication device illustrated in FIG. 13 is a BS according to an embodiment of the present disclosure to implement the embodiments of the present disclosure, the processor 10 may control the transceiver 35 to transmit, to a UE, information indicating to the UE to perform a DRX operation, and to transmit a PDCCH within an active time generated based on at least one of (Condition 1) to (Condition 7). A method of transmitting a PDCCH within an active time generated based on at least one of (Condition 1) to (Condition 7) may be based on the afore-described proposals. For example, from the perspective of the BS, the methods of monitoring a PDCCH within an active time based on at least one of (Condition 1) to (Condition 7) may be interpreted as methods of transmitting a PDCCH within an active time based on at least one of (Condition 1) to (Condition 7).

Figure 14:
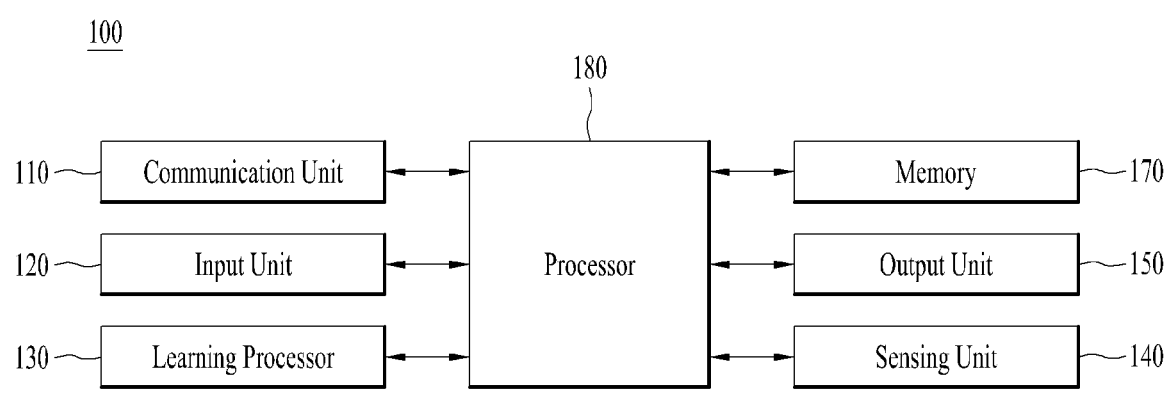
FIGS. 14, 15 and 16 are diagrams illustrating an example of an artificial intelligence (AI) system and AI apparatuses, for implementing embodiments of the present disclosure.

FIG. 14 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 14, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech to text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the STT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 15:
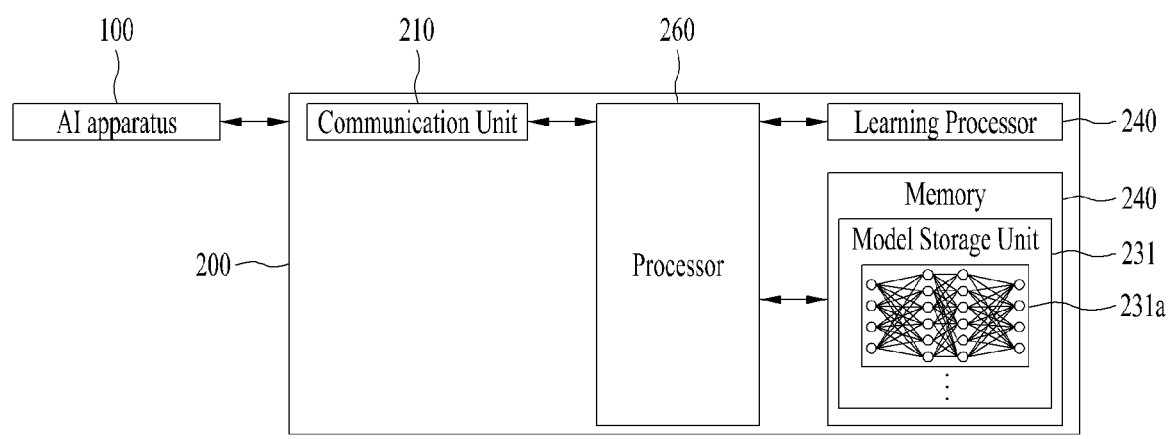

FIG. 15 illustrates the AI server 200 according to an embodiment of the present disclosure.

Referring to FIG. 15, the AI server 200 may mean a device for training an ANN based on a machine learning algorithm or a device for using a trained ANN. Here, the AI server 200 may include a plurality of servers to perform distributed processing or may be defined as a 5G network.

The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231*a*) through the learning processor 240.

The learning processor 240 may train the ANN 231*a* based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

Figure 16:
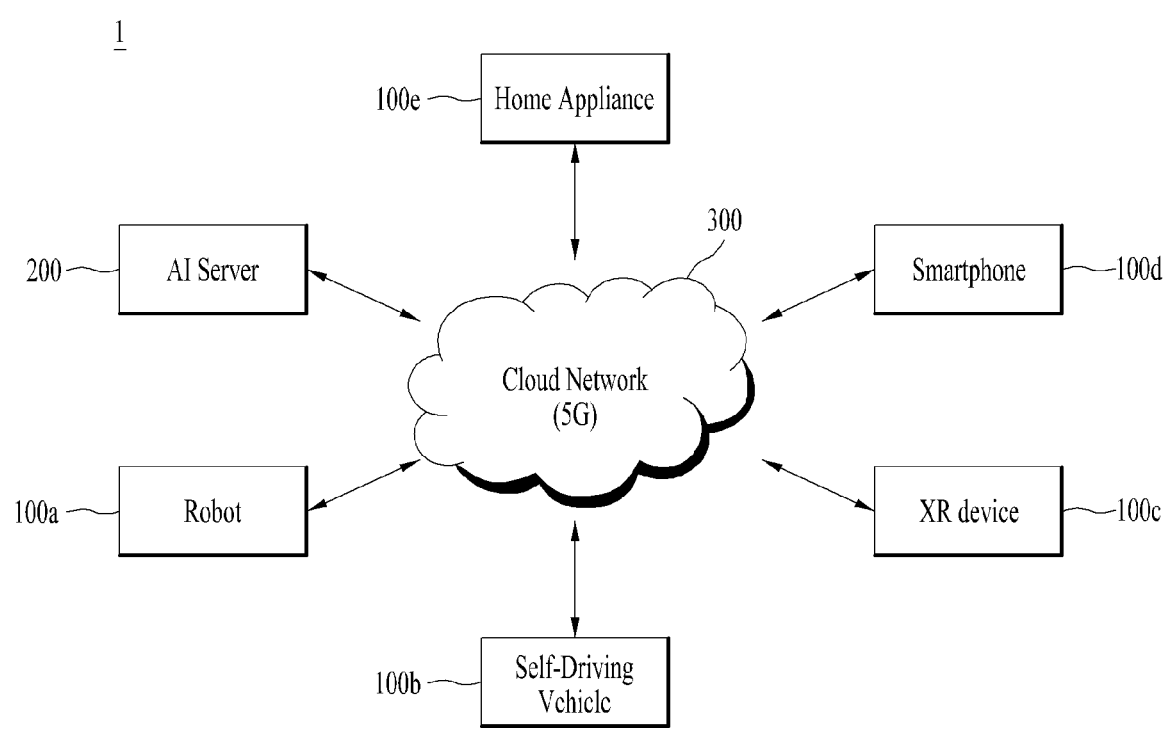

FIG. 16 illustrates an AI system 1 according to an embodiment of the present disclosure.

Referring to FIG. 16, at least one of the AI server 200, a robot 100*a*, an autonomous driving vehicle 100*b*, an XR device 100*c*, a smartphone 100*d*, and a home appliance 100*e* is connected to a cloud server 10 in the AI system 1. Here, the robot 100*a*, the autonomous vehicle 100*b*, the XR device 100*c*, the smartphone 100*d*, or the home appliance 100*e*, to which the AI technology is applied, may be referred to as an AI device 100*a* to 100*e*.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100*a* to 100*e* and 200 included in the AI system 1 may be connected to each other through the cloud network 10. In particular, the devices 100*a* to 100*e* and 200 may communicate with each other through a BS or may communicate with each other directly without the BS.

The AI server 200 may include a server in charge of AI processing and a server in charge of big data computation.

The AI server 200 may be connected to at least one of the robot 100*a*, the autonomous vehicle 100*b*, the XR device 100*c*, the smartphone 100*d*, or the home appliance 100*e* included in the AI system 1 via the cloud network 10 and help at least part of AI processing of the connected AI devices 100*a* to 100*e*.

In this case, the AI server 200 may train an ANN according to a machine learning algorithm on behalf of the AI devices 100*a* to 100*e* and directly store or transmit a learning model to the AI devices 100*a* to 100*e*.

The AI server 200 may receive input data from the AI devices 100*a* to 100*e*, infer a result value for the received input data based on the learning model, generate a response or control command based on the inferred result value, and transmit the response or control command to the AI devices 100*a* to 100*e*.

Alternatively, the AI devices 100*a* to 100*e* may directly infer the result value for the input data based on the learning model and generate the response or control command based on the inferred result value.

Hereinafter, various embodiments of the AI devices 100a to 100e to which the above-described technology is applied will be described. The AI devices 100a to 100e illustrated in FIG. 22 may be considered as a specific example of the AI device 100 illustrated in FIG. 20.

<AI+Robot>

If the AI technology is applied to the robot 100a, the robot 100a may be implemented as a guide robot, a transport robot, a cleaning robot, a wearable robot, an entertainment robot, a pet robot, an unmanned flying robot, etc.

The robot 100a may include a robot control module for controlling an operation, and the robot control module may refer to a software module or a chip implemented by hardware.

The robot 100a may obtain state information of the robot 100a, detect (recognize) a surrounding environment and objects, generate map data, determine a travel route or driving plan, or determine a response or action to user interaction by using sensor information obtained from various types of sensors.

To determine the travel route or driving plan, the robot 100a may use sensor information obtained from at least one of the following sensors: a LIDAR, a radar, and a camera to determine a movement route and a travel plan.

The robot 100a may perform the above-described operations based on a learning model configured with at least one ANN. For example, the robot 100a may recognize the surrounding environment and objects based on the learning model and determine an operation based on the recognized surrounding environment or object. Here, the learning model may be directly trained by the robot 100a or by an external device such as the AI server 200.

The robot 100a may operate by directly generating a result based on the learning model. Alternatively, the robot 100a may transmit sensor information to the external device such as the AI server 200 and receive a result generated based on the sensor information.

The robot 100a may determine the travel route and driving plan based on at least one of the map data, the object information detected from the sensor information, or the object information obtained from the external device. Then, the robot 100a may move according to the determined travel path and driving plan under control of its driving unit.

The map data may include object identification information about various objects placed in a space in which the robot 100a moves. For example, the map data may include object identification information about fixed objects such as walls and doors and movable objects such as flower pots and desks. The object identification information may include a name, a type, a distance, a position, etc.

The robot 100a may operate and move by controlling the driving unit based on the user control/interaction. In this case, the robot 100a may obtain intention information from the motion or speech of the user and determine a response based on the obtained intention information.

<AI+Autonomous Driving>

If the AI technology is applied to the autonomous driving vehicle 100b, the autonomous driving vehicle 100b may be implemented as a mobile robot, a vehicle, an unmanned flying vehicle, etc.

The autonomous driving vehicle 100b may include an autonomous driving control module for controlling the autonomous driving function, and the autonomous driving control module may refer to a software module or a chip implemented by hardware. The autonomous driving control module may be included in the autonomous driving vehicle 100b as a component thereof, but it may be implemented with separate hardware and connected to the outside of the autonomous driving vehicle 100b.

The autonomous driving vehicle 100b may obtain state information about the autonomous driving vehicle 100b based on sensor information acquired from various types of sensors, detect (recognize) a surrounding environment and objects, generate map data, determine a travel route and driving plan, or determine an operation.

Similarly to the robot 100a, the autonomous driving vehicle 100b may use the sensor information obtained from at least one of the following sensors: a LIDAR, a radar, and a camera so as to determine the travel route and driving plan.

In particular, the autonomous driving vehicle 100b may recognize an environment and objects in an area hidden from view or an area over a certain distance by receiving the sensor information from external devices. Alternatively, the autonomous driving vehicle 100b may receive information, which is recognized by the external devices.

The autonomous driving vehicle 100b may perform the above-described operations based on a learning model configured with at least one ANN. For example, the autonomous driving vehicle 100b may recognize the surrounding environment and objects based on the learning model and determine the driving path based on the recognized surrounding environment and objects. The learning model may be trained by the autonomous driving vehicle 100a or an external device such as the AI server 200.

The autonomous driving vehicle 100b may operate by directly generating a result based on the learning model. Alternatively, the autonomous driving vehicle 100b may transmit sensor information to the external device such as the AI server 200 and receive a result generated based on the sensor information.

The autonomous driving vehicle 100b may determine the travel route and driving plan based on at least one of the map data, the object information detected from the sensor information, or the object information obtained from the external device. Then, the autonomous driving vehicle 100b may move according to the determined travel path and driving plan under control of its driving unit.

The map data may include object identification information about various objects placed in a space (e.g., road) in which the autonomous driving vehicle 100b moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100b may operate and move by controlling the driving unit based on the user control/interaction. In this case, the autonomous driving vehicle 100b may obtain intention information from the motion or speech of a user and determine a response based on the obtained intention information.

<AI+XR>

When the AI technology is applied to the XR device 100c, the XR device 100c may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100c may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100c may output an XR object including information about a recognized object, that is, by matching the XR object with the recognized object.

The XR device 100c may perform the above-described operations based on a learning model configured with at least one ANN. For example, the XR device 100c may recognize the real object from the three-dimensional point cloud data or image data based on the learning model and provide information corresponding to the recognized real object. The learning model may be directly trained by the XR device 100c or an external device such as the AI server 200.

The XR device 100c may operate by directly generating a result based on the learning model. Alternatively, the XR device 100c may transmit sensor information to the external device such as the AI server 200 and receive a result generated based on the sensor information.

<AI+Robot+Autonomous Driving>

When the AI technology and the autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and the autonomous driving technology are applied may refer to the robot 100a with the autonomous driving function or the robot 100a interacting with the autonomous driving vehicle 100b.

The robot 100a having the autonomous driving function may be collectively referred to as a device that move along a given movement path without human control or a device that moves by autonomously determining its movement path.

The robot 100a having the autonomous driving function and the autonomous driving vehicle 100b may use a common sensing method to determine either a travel route or a driving plan. For example, the robot 100a having the autonomous driving function and the autonomous driving vehicle 100b may determine either the travel route or the driving plan based on information sensed through a LIDAR, a radar, and a camera.

The robot 100a interacting with the autonomous driving vehicle 100b may exist separately from with the autonomous driving vehicle 100b. That is, the robot 100a may perform operations associated with the autonomous driving function inside or outside the autonomous driving vehicle 100b or interwork with a user on the autonomous driving vehicle 100b.

The robot 100a interacting with the autonomous driving vehicle 100b may control or assist the autonomous driving function of the autonomous driving vehicle 100b by obtaining sensor information on behalf of the autonomous driving vehicle 100b and providing the sensor information to the autonomous driving vehicle 100b or by obtaining sensor information, generating environment information or object information, and providing the information to the autonomous driving vehicle 100b.

Alternatively, the robot 100a interacting with the autonomous driving vehicle 100b may monitor the user on the autonomous driving vehicle 100b or control the autonomous driving vehicle 100b through the interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only the autonomous driving function but also functions installed in the navigation system or audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the autonomous driving vehicle 100b outside the autonomous driving vehicle 100b. For example, the robot 100a may provide traffic information including signal information such as smart traffic lights to the autonomous driving vehicle 100b or automatically connect an electric charger to a charging port by interacting with the autonomous driving vehicle 100b like an automatic electric charger installed in an electric vehicle.

<AI+Robot+XR>

When the AI technology and the XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot subjected to control/interaction in an XR image. In this case, the robot 100a may be separated from the XR device 100c but interact with the XR device 100c.

When the robot 100a subjected to control/interaction in the XR image obtains sensor information from sensors including a camera, the robot 100a or XR device 100c may generate the XR image based on the sensor information, and then the XR device 100c may output the generated XR image. The robot 100a may operate based on a control signal input through the XR device 100c or user interaction.

For example, a user may confirm the XR image corresponding to the perspective of the robot 100a remotely controlled through an external device such as the XR device 100c. Then, the user may adjust the autonomous driving path of the robot 100a or control the operation or movement of the robot 100a through interaction therewith or check information about surrounding objects.

<AI+Autonomous Driving+XR>

When the AI technology and the XR technology is applied to the autonomous driving vehicle 100b, the autonomous driving vehicle 100b may be implemented as a mobile robot, a vehicle, an unmanned flying vehicle, etc.

The autonomous driving vehicle 100b to which the XR technology is applied may refer to an autonomous driving vehicle capable of providing an XR image or an autonomous driving vehicle subjected to control/interaction in an XR image. In particular, the autonomous driving vehicle 100b subjected to control/interaction in the XR image may be separated from the XR device 100c but interact with the XR device 100c.

The autonomous driving vehicle 100b capable of providing the XR image may obtain sensor information from sensors including a camera and output the generated XR image based on the obtained sensor information. For example, the autonomous driving vehicle 100b may include an HUD for outputting an XR image, thereby providing a user with an XR object corresponding to an object in the screen together with a real object.

When the XR object is displayed on the HUD, at least part of the XR object may overlap with the real object which the user look at. On the other hand, when the XR object is displayed on a display provided in the autonomous driving vehicle 100b, at least part of the XR object may overlap with the object in the screen. For example, the autonomous driving vehicle 100b may output XR objects corresponding to objects such as a lane, another vehicle, a traffic light, a traffic sign, a two-wheeled vehicle, a pedestrian, a building, etc.

When the autonomous driving vehicle 100b subjected to control/interaction in the XR image may obtain the sensor information from the sensors including the camera, the autonomous driving vehicle 100b or the XR device 100c may generate the XR image based on the sensor information, and then the XR device 100c may output the generated XR image. The autonomous driving vehicle 100b may operate based on a control signal input through an external device such as the XR device 100c or user interaction.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting and receiving a DL control channel have been described above in the context of being applied to a 5G NewRAT system, they are also applicable to various wireless communication systems other than the 5G NewRAT system.

The invention claimed is:

1. A method of receiving a physical downlink control channel (PDCCH) by a user equipment (UE) configured to a discontinuous reception (DRX) operation in a wireless communication system, the method comprising:
    starting an active time to monitor the PDCCH based on a timer of a plurality of timers; and
    receiving the PDCCH in PDCCH monitoring occasions allocated within a duration of the active time,
    wherein the PDCCH monitoring occasions occur less often based on the timer being an on duration timer, rather than based on the timer being an inactivity timer.

2. The method according to claim 1, wherein a first downlink control information (DCI) format received in a first duration among a durations of the active time is different from a second DCI format received in a second duration among the durations of the active time.

3. The method according to claim 2, wherein the first duration precedes the second duration, the first DCI format is fallback DCI, and the second DCI format is fallback DCI or non-fallback DCI.

4. The method according to claim 1, wherein a type of a search space allocated within the duration of the active time is based on the timer.

5. The method according to claim 1, wherein DCI informing a slot format for a predetermined duration is also received during a duration other than the active time.

6. The method according to claim 1, wherein the UE is communicable with at least one of another UE, a network, a base station (BS), or an autonomous driving vehicle.

7. An apparatus configured to a discontinuous reception (DRX) operation to receive a physical downlink control channel (PDCCH) in a wireless communication system, the apparatus comprising:
    at least one processor; and
    at least one computer memory operably connectable to the at least one processor and storing instructions that, when executed by the at least one processor, perform operations comprising:
    starting an active time to monitor the PDCCH based on a timer of a plurality of timers; and
    receiving the PDCCH in PDCCH monitoring occasions allocated within a duration of the active time, and
    wherein the PDCCH monitoring occasions occur less often based on the timer being an on duration timer, rather than based on the timer being an inactivity timer.

8. The apparatus according to claim 7, wherein a first downlink control information (DCI) format received in a first duration among a durations of the active time is different from a second DCI format received in a second duration among the durations of the active time.

9. The apparatus according to claim 8, wherein the first duration precedes the second duration, the first DCI format is fallback DCI, and the second DCI format is fallback DCI or non-fallback DCI.

10. The apparatus according to claim 7, wherein a type of a search space allocated within the duration of the active time is based on the timer.

11. The apparatus according to claim 7, wherein DCI informing a slot format for a predetermined duration is also received during a duration other than the active time.

12. The apparatus according to claim 7, wherein the apparatus is communicable with at least one of a UE, a network, a base station (BS), or an autonomous driving vehicle other than the apparatus.

13. A user equipment (UE) configured to a discontinuous reception (DRX) operation to receive a physical downlink control channel (PDCCH) in a wireless communication system, the UE comprising:
at least one transceiver;
at least one processor; and
at least one computer memory operably connectable to the at least one processor and storing instructions that, when executed by the at least one processor, perform operations comprising:
starting an active time to monitor the PDCCH based on timer of a plurality of timers; and
receiving the PDCCH in PDCCH monitoring occasions allocated within a duration of the active time, and
wherein the PDCCH monitoring occasions occur less often based on the timer being an on duration timer, rather than based on the timer being an inactivity timer.

14. A method of transmitting a physical downlink control channel (PDCCH) by a base station (BS) supporting a discontinuous reception (DRX) operation in a wireless communication system, the method comprising:
transmitting the PDCCH in PDCCH monitoring occasions allocated within a duration of an active time,
wherein the active time is started based on a timer of a plurality of timers, and
wherein the PDCCH monitoring occasions occur less often based on the timer being an on duration timer, rather than based on the timer being an inactivity timer.

15. A base station (BS) supporting a discontinuous reception (DRX) operation to transmit a physical downlink control channel (PDCCH) in a wireless communication system, the BS comprising:
at least one transceiver;
at least one processor; and
at least one computer memory operably connectable to the at least one processor and storing instructions that, when executed by the at least one processor, perform operations comprising:
transmitting the PDCCH in PDCCH monitoring occasions allocated within a duration of an active time, and
wherein the active time is started based on a timer of a plurality of timers, and
wherein the PDCCH monitoring occasions occur less often based on the timer being an on duration timer, rather than based on the timer being an inactivity timer.

* * * * *